(12) United States Patent
Yamada

(10) Patent No.: US 9,855,886 B2
(45) Date of Patent: Jan. 2, 2018

(54) PHYSICAL TIRE TRACKS COUPLED TO HEADLIGHTS

(71) Applicant: Honda Motor Co., Ltd., Minato-ku, Tokyo (JP)

(72) Inventor: Hajime Yamada, Rancho Palos Verdes, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/801,170

(22) Filed: Jul. 16, 2015

(65) Prior Publication Data

US 2017/0015238 A1    Jan. 19, 2017

(51) Int. Cl.
| | |
|---|---|
| *B60Q 1/34* | (2006.01) |
| *B60Q 1/12* | (2006.01) |
| *B60Q 1/18* | (2006.01) |
| *F21S 8/10* | (2006.01) |

(52) U.S. Cl.
CPC ............. *B60Q 1/122* (2013.01); *B60Q 1/18* (2013.01); *F21S 48/1721* (2013.01); *B60Q 2300/122* (2013.01); *B60Q 2400/50* (2013.01)

(58) Field of Classification Search
CPC .... B60K 2350/1076; B60K 2350/2052; B60K 35/00; G06K 9/00751; G06T 2207/30196; G06T 2207/30241; G06T 7/20; G02B 27/0172; G02B 27/0176; G09B 9/307; A42B 3/042
USPC .... 340/465, 463, 457.2, 468, 488, 555, 556, 340/557, 654, 825.97, 815.65, 340/815.75–815.77
See application file for complete search history.

(56) References Cited

U.S. PATENT DOCUMENTS

| | | | |
|---|---|---|---|
| 3,189,737 A | 6/1965 | Lawless | |
| 5,499,168 A * | 3/1996 | Cochard | B60Q 1/0011 180/169 |
| 6,059,435 A * | 5/2000 | Hamm | F21S 48/1731 362/284 |
| 6,198,386 B1 | 3/2001 | White, II | |
| 6,955,439 B2 | 10/2005 | Reismiller et al. | |
| 7,043,342 B1 | 5/2006 | Dewees | |
| 7,611,266 B2 | 11/2009 | Ibrahim et al. | |
| 7,650,698 B2 | 1/2010 | Stewart, III | |
| 7,699,509 B2 | 4/2010 | Leleve | |
| 7,753,569 B2 | 7/2010 | Yamazaki et al. | |
| 7,860,627 B2 | 12/2010 | Horii et al. | |
| 8,026,800 B2 | 9/2011 | Person | |
| 8,511,872 B2 | 8/2013 | Schmidt et al. | |
| 8,665,116 B2 | 3/2014 | Ghneim | |
| 2001/0030688 A1* | 10/2001 | Asahi | B60Q 9/005 348/118 |

(Continued)

*Primary Examiner* — Daniel Previl
(74) *Attorney, Agent, or Firm* — Arent Fox LLP

(57) ABSTRACT

A tire track indicator system is provided that couples physical tire tracks to headlights of a vehicle. The tire track indicator system of the vehicle includes an angle monitor that determines a steering direction of the vehicle. The tire track indicator system also includes an illumination source and a lens that directs at least a portion of light in the steering direction and provides an indication of a travel path of the vehicle. A direction of at least the portion of light is altered based on a corresponding change to the steering direction. Further, the indication includes at least one lens that outputs respective colors based on a set of contexts of the vehicle.

19 Claims, 16 Drawing Sheets

(56) References Cited

U.S. PATENT DOCUMENTS

| | | | |
|---|---|---|---|
| 2005/0117358 A1* | 6/2005 | Fukawa | B60Q 1/12 362/460 |
| 2005/0182539 A1* | 8/2005 | Maass | B60Q 9/008 701/41 |
| 2006/0287826 A1* | 12/2006 | Shimizu | B60K 35/00 701/431 |
| 2007/0052555 A1 | 3/2007 | Ibrahim | |
| 2010/0308988 A1* | 12/2010 | Ieda | B60Q 1/40 340/477 |
| 2012/0016555 A1 | 1/2012 | Ghneim | |
| 2013/0054089 A1 | 2/2013 | Nordbruch et al. | |
| 2013/0231825 A1* | 9/2013 | Chundrlik, Jr. | B60W 50/0098 701/29.1 |
| 2013/0335212 A1 | 12/2013 | Purks et al. | |
| 2014/0078306 A1* | 3/2014 | Miyoshi | B60R 1/00 348/148 |
| 2014/0172239 A1 | 6/2014 | Vergara et al. | |
| 2014/0267415 A1 | 9/2014 | Tang et al. | |
| 2014/0297120 A1* | 10/2014 | Cotgrove | B60T 8/17552 701/41 |
| 2014/0328071 A1 | 11/2014 | Son et al. | |
| 2016/0034771 A1* | 2/2016 | Schamp | G01B 11/2545 348/148 |

\* cited by examiner

PHYSICAL TIRE TRACKS COUPLED TO HEADLIGHTS

BACKGROUND

Markings are placed on road surfaces to provide guidance and information. For example, travel lane markings may be painted on a road surface to inform a driver (as well as others) about the various lanes of traffic to help prevent vehicle collisions. On a simple, two-way road, there may be a single lane marking, down the middle of the road. For roads with more than one lane in a single direction, the lane markings may designate a current lane of travel for each traffic direction.

As a driver navigates their vehicle down the road, the driver may attempt to keep their vehicle within a single lane of traffic. However, there may be times when the vehicle may drift into another lane of traffic. This drifting may be unintentional and, at times, the driver may not realize that the vehicle is straying into an adjacent lane.

BRIEF DESCRIPTION

This brief description is provided to introduce a selection of concepts in a simplified form as compared to that described below in the detailed description. This brief description is not intended to be an extensive overview of the claimed subject matter, identify key factors or essential features of the claimed subject matter, nor is it intended to be used to limit the scope of the claimed subject matter.

An implementation of this disclosure relates to a tire track indicator system of a vehicle. The tire track indicator system may include an angle monitor determining a steering direction of the vehicle. The tire track indicator system may also include an illumination source and a lens directing at least a portion of light from the illumination source in the steering direction providing an indication of a travel path of the vehicle. A direction of at least the portion of light is altered based on a corresponding change to the steering direction.

Another implementation of this disclosure relates to a method for providing an indication of a projected path of a vehicle to a driver of the vehicle. The method may include outputting an indication of a vehicle path. Outputting the indication may include using a first lens and a light source. The method may also include determining, by a system having a processor, a steering path of the vehicle. Further, the method may include moving, by the system, the first lens to follow the steering path of the vehicle.

A further implementation of this disclosure relates to a tire track indicator system that may include an angle monitor determining a steering direction of the vehicle. The tire track indicator system may also include an illumination source, a first lens, and at least a second lens providing an indication of a travel path of the vehicle based on the steering direction. The indication may be altered based on a change to the steering direction. Further, the first lens and at least the second lens are coupled to the headlights of the vehicle generating physical tire tracks of the vehicle.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings.

DETAILED DESCRIPTION

Figure 1:
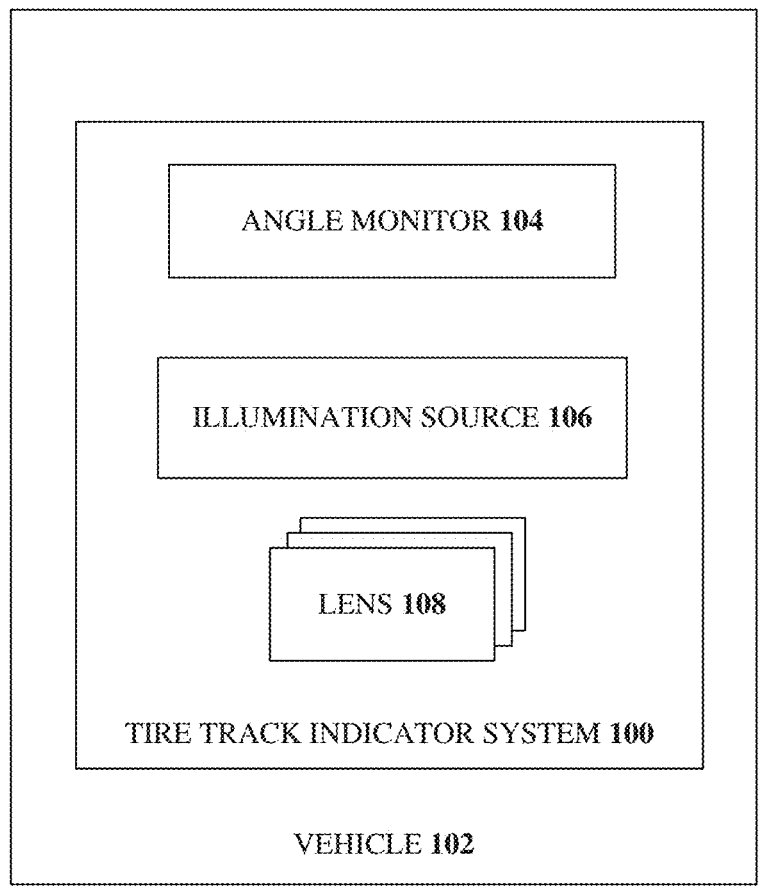
FIG. 1 illustrates an example, non-limiting, tire track indicator system of a vehicle, according to an aspect of this disclosure.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

FIG. 1 illustrates an example, non-limiting, tire track indicator system 100 of a vehicle 102, according to an aspect of this disclosure. The tire track indicator system 100 allows a driver (and others) to perceive a projected travel path of the vehicle. According to some implementations, the tire track indicator system 100 may be configured to redirect a portion of a light source to match the direction of the tires.

The tire track indicator system 100 may include an angle monitor 104 that may determine a steering direction of the vehicle 102. For example, the steering direction of the vehicle may be in substantially a straight path, turning, swerving, and so on. Further, the steering direction may be in a forward direction or a reverse direction relative to the vehicle.

The steering direction may be determined by the angle monitor 104 based on a direction of the wheels relative to the vehicle. For example, if the vehicle is drifting to the left, the wheels may be pointing, at least slightly, toward the left. In another example, if the vehicle is turning right, the wheels may be pointed substantially toward the right. Additionally or alternatively, the angle monitor 104 may determine the steering direction based on sensors associated with a steering wheel or based on other sensors and/or inputs.

An illumination source 106 is also included in the tire track indicator system 100. According to some implementations, the illumination source 106 is one or more headlights, or other lights, of the vehicle. Thus, the illumination source 106 may perform a first function (e.g., operate as headlights) and may also perform a second function (e.g., provide an indication related to the travel path of the vehicle 102). However, according to alternative implementations, the illumination source 106 is separate from other illumination sources.

The tire track indicator system 100 may also include at least one lens 108 (or a series of lenses). The lens, or the series of lenses, may be physical lenses associated with the vehicle to simulate the tire tracks. The lenses may be operatively attached to the vehicle on a swivel or other type of mechanism that allows the lenses to move relative to a direction of the vehicle. It is noted that although various aspects may be discussed with respect to a single lens, it should be understood that more than one lens may be utilized with the disclosed aspects.

The at least one lens 108 may be operatively attached to the vehicle 102 (e.g., placed, at least partially, on an outside portion of the vehicle), operatively integrated with the vehicle 102, or combinations thereof. In some implementations, a first lens is operatively attached to the vehicle and at least a second lens is operatively integrated with the vehicle.

Additionally or alternatively, one or more lenses may be integrated with one or more lights of the vehicle (e.g., headlights, taillights, parking lights, fog lights, and so on) according to the implementations where the illumination source 106 provides dual functions.

The lens 108 may be located at any portion of the vehicle, provided the illumination source 106 is able to direct light toward the lens 108. In one implementation, the lens 108 may be operatively attached or operatively connected to a front portion of the vehicle 102. In another example, the lens 108 may be operatively attached/connected to a side portion of the vehicle or, alternatively, to an upper portion of the vehicle 102 (e.g., on or near a roof of the vehicle). In a further example, the lens 108 may be operatively attached/connected to a rear portion of the vehicle 102. Further, two or more lenses may be utilized with the disclosed aspects. For example, a first lens may be located on or near a first side of the vehicle (e.g., a passenger side) and a second lens may be located on or near a second side of the vehicle (e.g., a driver side). Thus, lenses may be placed on the outside of the vehicle, may be integrated with the vehicle, or combinations thereof.

The lens 108 may be configured to project at least one indication associated with a travel direction of the vehicle. The at least one indication may include at least one beam of light. The indication may be output external to the vehicle and displayed directly on the road or on objects in the road (e.g., another vehicle, debris in the road, and so on). In an aspect, the indication (or beam of light) may be projected in a forward direction travel of the vehicle. However, the disclosed aspects are not limited and, in some implementations, the lens 108 (or another lens) may be configured to project an indication of the steering direction in a backward direction (e.g., in a reverse direction of the vehicle). The projection of the at least one beam of light in a rearward direction, away from the vehicle, illustrates the direction of travel to others that are in the vicinity of the vehicle. In some implementations, a first lens may output or project an indication of the steering direction toward a forward direction of travel and a second lens may output or project the indication of the steering direction in a backward direction.

According to some implementations, a series of lenses are utilized to indicate a steering path of the vehicle. The series of lenses may be placed on a front portion of the vehicle, or within the vehicle, provided the series of lenses, and the light directed through the series of lenses, mimic the tire tracks. Thus, one or more indicators may be projected in front of the vehicle. In another implementation, the one or more indicators may be projected outward from a rear portion of the vehicle. Further, in some implementations, indicators may be projected both in front of the vehicle and behind the vehicle.

For example, the indication may include a first beam of light that travels a path of a first wheel of the vehicle (based on an angle or direction the first beam of light travels through a first lens). The indication may also include a second beam of light that travels another path of a second wheel of the vehicle (based on an angle or direction the second beam of light travels through a second lens). However, according to some implementations, the first beam of light, the second beam of light, and any subsequent beams of light, may travel a path of a single wheel of the vehicle.

In another example, the indication may include a set of lenses that couples headlights of the vehicle to physical tire tracks of the vehicle. In such a manner, the headlights (or at least a portion of the headlights) of the vehicle operate as the illumination source and the indication. For example, one or more headlights may be configured to move (e.g., rotate, swivel, pivot, and so on) to track a path of the vehicle. In another implementation, a lens may be separate from, or may be integrated in, a headlight (e.g., located within a portion of the headlight). The separate lens/illumination source may move independent from the headlight, which may remain stationary.

For example, as the vehicle is steered, the vehicle may be maintained in substantially a straight path, such as following a road. Further, the vehicle may be operated (intentionally or unintentionally) in a manner where the vehicle is caused to change lanes, drift toward an adjacent lane, drift toward an edge of the road, and so on. Thus, the indication may be altered based on a current steering direction. The altering of the indication may be performed continuously, periodically, based on a threshold amount of change (e.g., more than a 5 degree change of direction, or other amount or parameter), or based on other considerations, including a driver preference. In this manner, the indication provides a current projected path of the vehicle.

In yet another example, the illumination source may have luminesce that is a brighter intensity than another luminesce projected by headlights of the vehicle. The brighter intensity allows the illumination source to be perceived when the headlights are illuminated. According to some implementations, the lens 108 may be configured to concentrate light from the illumination source 106 such that the light projecting from the lens 108 has an increased intensity.

According to an implementation, at least a first illumination source projects outward from a front portion of the vehicle and toward a direction of forward travel. Further, at least a second illumination source projects outward from a rear portion of the vehicle, away from a forward direction of travel. Based on an activity of the vehicle, the first illumination source, the second illumination source, or both the first illumination source and the second illumination source change color. According to some implementations, the color change is implemented by the lens 108. For example, the activity may be a lane change. In another example, the activity may be weaving within a single lane, or entering one or more adjacent lanes. In a further example, the activity may be swerving. In yet another example, the activity may be driving in reverse.

Further, the one or more lenses may be independent (or operate independent) of a head-up display (HUD) that provides HUD tire tracks. This independence allows the lenses (or the headlights) to mimic the vehicle's tire tracks as discussed herein. The mimicking of the tire tracks may be shortened or lengthened depending on whether the vehicle is departing from, or entering, a traffic lane. According to an implementation, the one or more lenses may couple the headlights to the physical tire tracks (or projected physical tire tracks) to assist the driver in maintaining their lane, navigating objects, or performing other navigations with the vehicle.

In an additional and/or alternative implementation, color changes or other output changes may be implemented based upon the context (e.g., blind spot car, deviation, chronic deviation, and so on). For example, a beam color may change to provide an indication of an activity that is occurring (e.g., the vehicle is changing lanes without the use of a turn signal, the vehicle is drifting out of its lane, the vehicle is turning a corner, and so on).

In a further example, the indication may include at least one lens that outputs respective colors based on a set of contexts of the vehicle. A first context of the set of contexts may include the steering direction of the vehicle and a second context of the set of contexts may include a deviation of the vehicle from a current lane. In another implementation, a first context of the set of contexts may include the steering direction of the vehicle and a second context of the set of contexts may include a chronic deviation of the vehicle from a current lane.

Alternatively or additionally, an output of the indication may change. For example, a constant beam(s) of light may be output and, based on a condition, may transition to a flashing beam(s) of light. For example, if the vehicle is headed into an oncoming lane of traffic, the beam of light may flash and/or an intensity level of the beam of light may increase. In another example, if the vehicle is deviating from a current lane, the one or more indicators may extend to infinity (e.g., as far as a light beam may extend). Further, the beam of light may lengthen when the vehicle is departing from a traffic lane, according to an aspect.

Thus, based on the indication, a driver of the vehicle may perceive whether the vehicle is headed into an adjacent lane, or about to drive off the road, and the driver may take corrective action, as necessary. Further, other people in the vicinity (e.g., other drivers, pedestrians, and so on) may also perceive the trajectory of the vehicle and take any necessary action.

Figure 2:
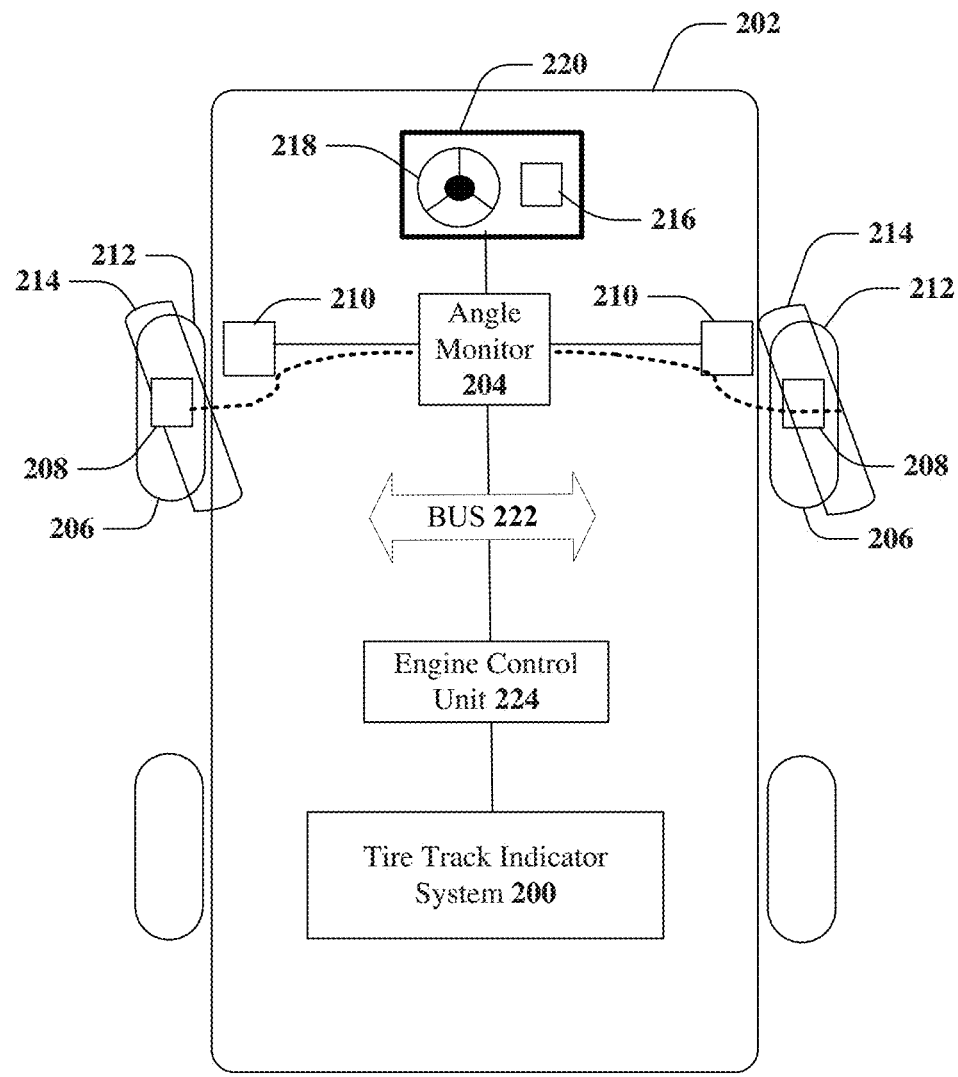
FIG. 2 illustrates an example, non-limiting, block diagram of a tire track indicator system, according to an aspect of this disclosure.

FIG. 2 illustrates an example, non-limiting, block diagram of a tire track indicator system 200 (e.g., the tire track indicator system 100 of FIG. 1), according to an aspect of this disclosure. The tire track indicator system 200 may be contained, at least partially, in a vehicle 202. Fewer or more components than those shown and described may be utilized in a tire track indicator system 200 and the described embodiment should not be construed as limiting.

An angle monitor 204 (e.g., the angle monitor 104 of FIG. 1) may be configured to determine a steering direction or an angle of the wheels 206 of the vehicle 202. The angle of the wheels 206 may be measured through a number of different systems and is not limited to the system shown and described herein.

In an embodiment, respective sensors 208 within the wheels 206 may communicate with respective receivers 210. Through the respective sensors 208 and the respective receivers 210, a wheel angle, or steering direction, may be determined. For example, the angle monitor 204 may determine whether the wheels are in a first position 212 or in a second position 214. At about the same time as the angle monitor 204 determines the steering direction, this information may be provided to the tire track indicator system 200. Speed information, as well as other data, may also be monitored and provided by the angle monitor 204 and/or other components of the vehicle 202.

According to an embodiment, the angle monitor 204 may detect the angle of the wheels 206 through sensors 216 on a steering column 218. The sensors 216 and steering column 218 may be components of an electric power steering system 220 that assists the driver to steer the vehicle 202. One or more sensors, including the sensor 216, may be associated with the electric power steering system 220. By using the power steering system 220, steering directions may be monitored more closely with the driver's intentions. The information may be directed to a bus 222 and communicated with other systems in the vehicle 200, such as an engine control unit 224 and the tire track indicator system 200, as well as other components.

Figure 3:
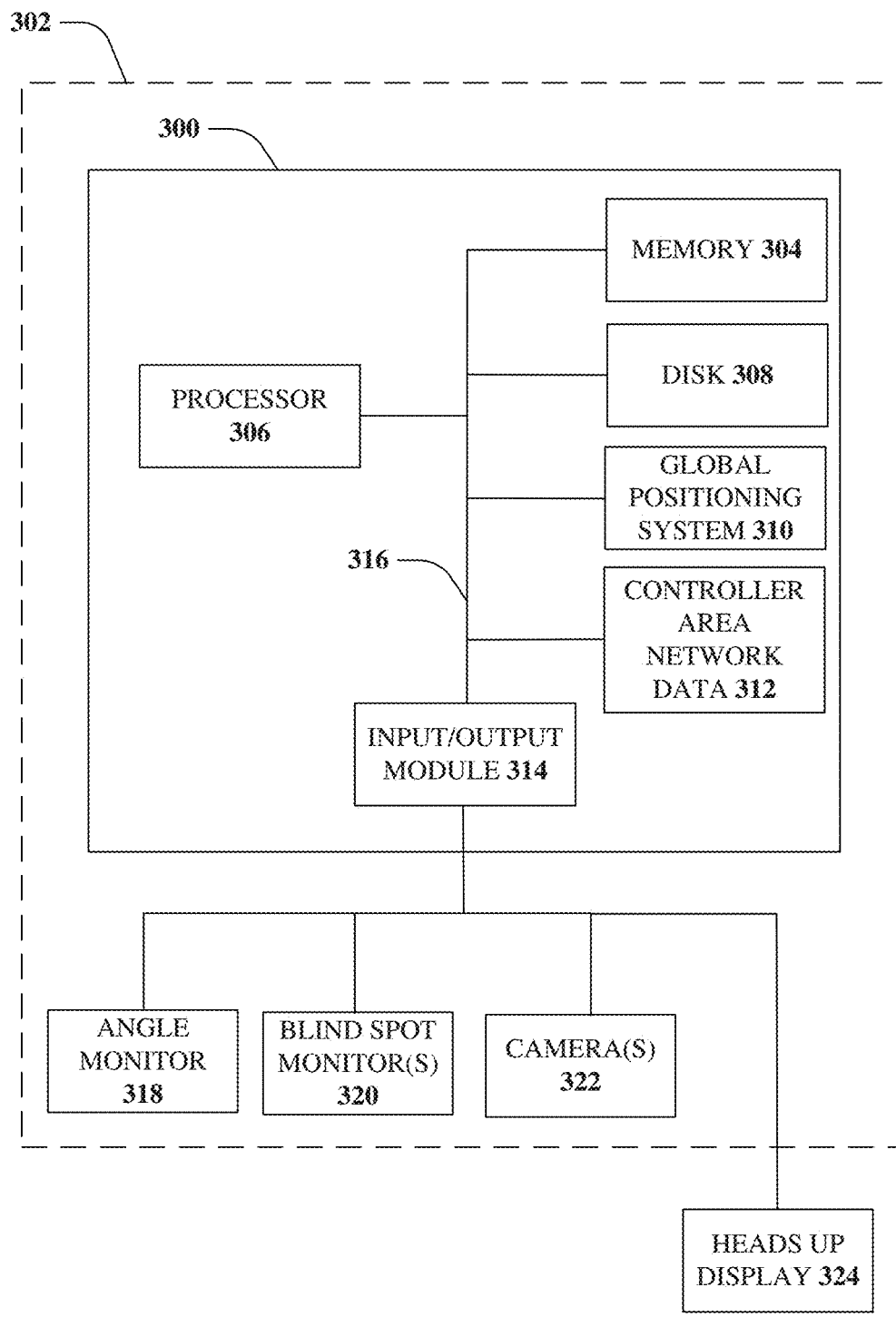
FIG. 3 illustrates an example, non-limiting, block diagram of exemplary components for a tire track indicator system, according to an aspect of this disclosure.
Figure 4:
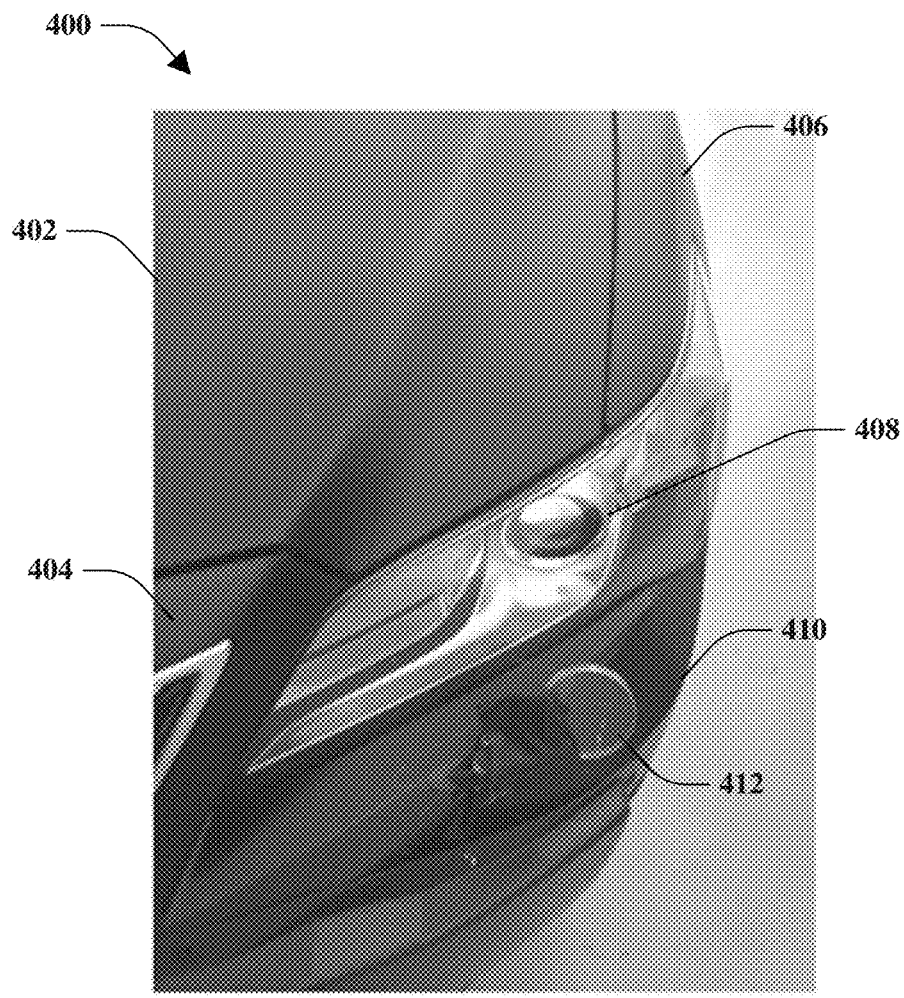
FIG. 4 illustrates an example, non-limiting, representation of a portion of a vehicle that includes one or more lenses placed on the vehicle to mimic tire tracks of the vehicle, according to an aspect of this disclosure.
Figure 5:
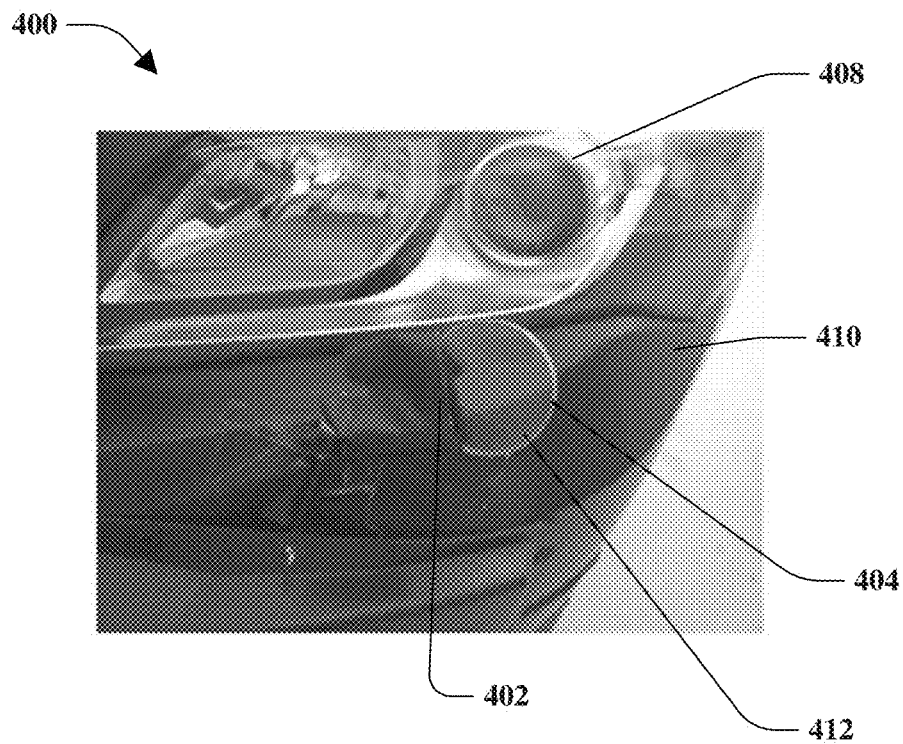
FIG. 5 illustrates a close-up view of the exemplary lens of FIG. 4, according to an aspect of this disclosure.
Figure 6:
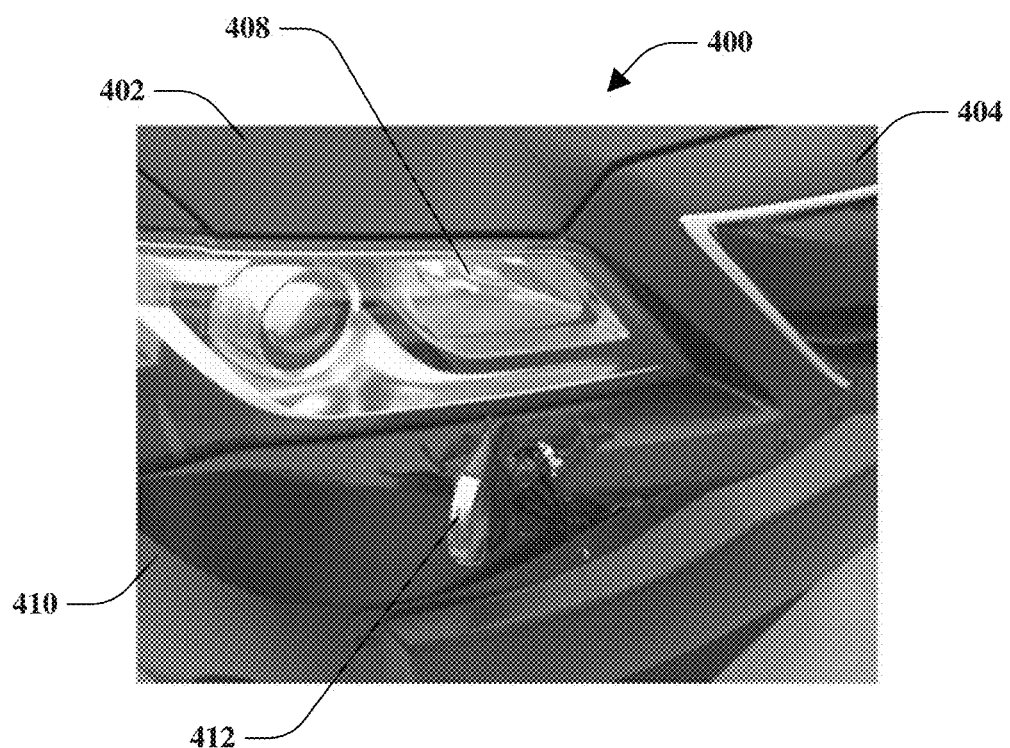
FIG. 6 illustrates a view of another exemplary lens that tracks a position of a wheel, according to an aspect of this disclosure.

FIG. 3 illustrates an example, non-limiting, block diagram of exemplary components for a tire track indicator system 300, according to an aspect of this disclosure. The tire track indicator system 300 may be configured to process steering directions and provide output to a driver. Fewer or more components than those shown and described may be utilized in a tire track indicator system 300 and the described embodiments should not be construed as limiting.

The tire track indicator system 300 (e.g., the tire track indicator system 200 of FIG. 2) may be included, at least partially, within a vehicle 302 (e.g., the vehicle 202 of FIG. 2). The tire track indicator system 300 may include at least one memory 304 that may store computer executable components and/or computer executable instructions. The tire track indicator system 300 may also include at least one processor 306, communicatively coupled to the at least one memory 304. The at least one processor 306 may facilitate execution of the computer executable components and/or the computer executable instructions stored in the memory 304.

The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or as instructions separate from the memory 304 (e.g., operatively connected to the memory 304), the various aspects are not limited to this implementation. Instead, in accordance with various implementations, the one or more computer executable components and/or the one or more computer executable instructions may be stored in (or integrated within) the memory 304. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

Also included in the tire track indicator system 300 may be a disk 308, a global positioning system 310, a controller area network data 312, and an input/output module 314, which may communicate through a bus 316. The input/output module 314 may communicate with an angle monitor 318 (e.g., the angle monitor 204 of FIG. 2). In addition, the input/output module 314 may communicate with one or more blind spot monitors 320 and one or more cameras 322.

The one or more blind spot monitors 320 may be operatively attached to the vehicle 302 and may be configured to detect neighboring vehicles in adjacent lanes. Based on the presence of neighboring vehicles, a change (e.g., color, brightness, length, pattern, and so forth) to one or more tire track indicators may be implemented to convey the information to the driver.

The one or more cameras 322 may be configured to detect traffic lanes in front of the vehicle 302. Based on the detected lanes, a change to one or more indicators may be implemented to inform the driver that the vehicle is headed toward a detected lane. Fewer or more types of sensors may be provided and are not limited to the sensors shown and described.

The global positioning system 310 may be configured to determine a location of the vehicle 302. According to some implementations, the global positioning system 310 may be embedded, at least partially, in the tire track indicator system 300 or may be provided through a separate system. The controller area network data 312 may be retrieved from the sensors on the vehicle 302. The controller area network data 312 may be processed and provided as output to the driver or other occupant of the vehicle 302. As used herein, an occupant of the vehicle may include a driver of the vehicle, an operator of the vehicle, an individual, an entity, a person, a passenger, and so on. Further, as used herein, an operator of a vehicle may be a driver of a vehicle or an occupant who provides one or more vehicle operations or commands to the vehicle, such as steering commands, for example.

According to some implementations, the input/output module 314 may be configured to communicate with a heads-up display 324 that may be configured to provide augmented reality indicators for the tire track indicator system 300. The disclosed aspects are configured to provide the indication of the tire tracks without the use of a heads up display. However, according to an implementation, the data may be provided as output through the heads up display 324.

Further, the global positioning system 310, in addition to mapping information, which may be stored locally at the vehicle 302 or remotely from the vehicle 302, may be used with the tire track indicator system 300 to correlate tire track information and/or traffic lane information with the heads-up display 324.

FIGS. 4-7 illustrate example, non-limiting representations of a portion of a vehicle 400 that includes one or more lenses placed on or within the vehicle to mimic tire tracks of the vehicle 400, according to an aspect of this disclosure. As illustrated, a vehicle 400 may include a hood 402, a front grille 404, and side panels 406 located on respective sides (e.g., driver, passenger) of the vehicle 400. Also included are headlights 408, as well as additional lights, for example, parking lights, fog lights, and so on. A front bumper 410 is also illustrated.

At least one lens 412 may be operatively connected to a front portion of the vehicle 400. Although illustrated as connected to the front bumper 410, the disclosed aspects are not limited to this implementation. Instead, the one or more lenses may be connected to other portions of the vehicle. Further, the one or more lenses may be included inside the vehicle, provided the indication of the lane steering may be perceived by the driver.

In the implementation illustrated, the at least one lens 412 may be located at about the same vertical position as the headlight 408. For example, a lens located on a driver side of the vehicle may be in substantially the same vertical plane as a headlight located on the driver side of the vehicle. Further, another lens located on a passenger side of the vehicle may be in substantially the same vertical plane as another headlight located on the passenger side of the vehicle. However, the disclosed aspects are not limited to this implementation. For example, a single lens or source of a tire track indicator may be provided, such as at a center portion, off center portion, or a side portion of the vehicle. In another example, a single lens or source of tire track indicator may be operatively connected to a side of the vehicle, or to both sides of the vehicle.

In the illustrated embodiment, the lens 412 may rotate and the respective headlight 408 may provide the illumination source for the output of the tire track indicator. For example, the lens may be configured to concentrate at least a portion of the light from the headlight to provide the indication, which may be distinguished by an observer from the light emitted by the headlight.

The one or more lenses 412 may be operatively connected to the vehicle 400 (e.g., the front bumper 410 or another portion of the vehicle) in a movable configuration. For example, the one or more lenses 412 may track the movement of respective wheels or tires of the vehicle 400. Thus, one or more lenses located on a driver side may mimic the steering tire (e.g., front tire) located on the driver side, and one or more other lenses located on a passenger side may mimic the steering tire (e.g., front tire) located on the passenger side. Thus, the one or more lenses 412 may be located on the vehicle such that the one or more lenses 412 may turn as the tires turn, such as when the vehicle is going around a bend, as the vehicle is being driven straight down the road, and so on. Further, the one or more lenses 412 may be connected to the vehicle 400 at a first end 402 and the second end 404 may be configured to move away from the vehicle 400.

Figure 7:
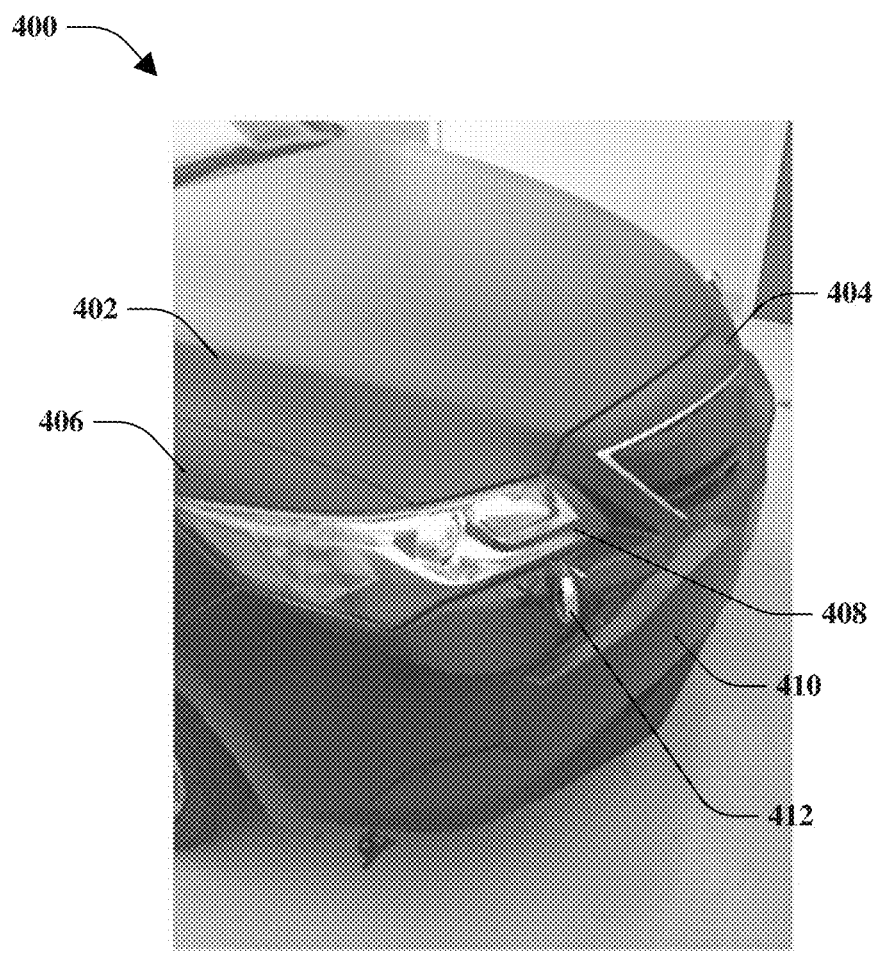
FIG. 7 illustrates another exemplary view of the lens of FIG. 6 that tracks a position of the wheel, according to an aspect of this disclosure.

For example, as illustrated in FIG. 7, when a passenger side tire moves to turn the vehicle to the left, the lens 412 moves away from the vehicle 400, in a leftward direction to mimic the tire tracks. According to some implementations, another lens located on the driver side may move toward the vehicle 400, in a leftward direction to mimic the tire tracks. In a similar manner, when the vehicle turns to the right, the lens on the passenger side moves inward, toward the vehicle in a rightward direction and the lens on the driver side moves outward, away from the vehicle in a rightward direction.

Figure 8:
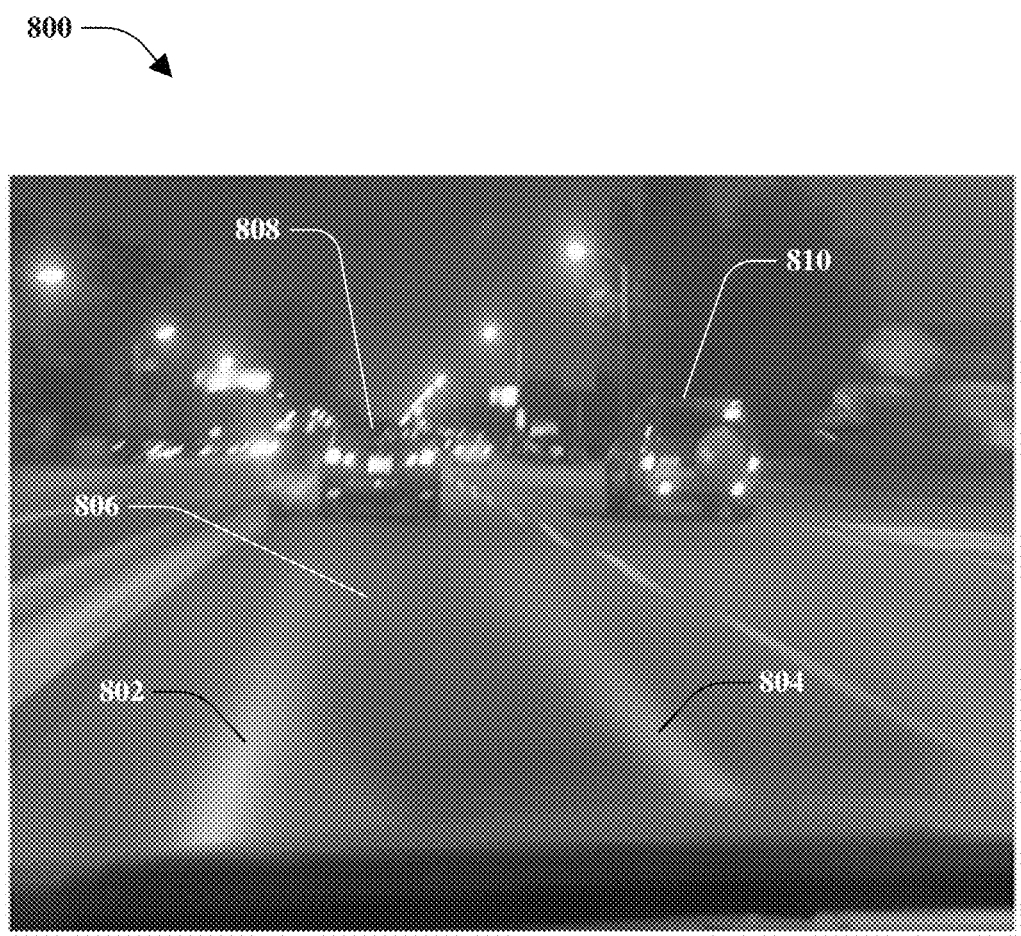
FIG. 8 illustrates an example representation of a tire track indicator system that generates and provides illumination for projected tire tracks, according to an aspect of this disclosure.

FIG. 8 illustrates an example representation of a tire track indicator system 800 that generates and provides illumination for projected tire tracks, according to an aspect of this disclosure. For example, as a vehicle is driven down the street, the tires may be in a substantially straight position, and thus, the vehicle travels in a substantially straight direction on the road, following a curvature of the road. However, there may be times when a driver unintentionally (or intentionally) causes the vehicle to travel a path such that the vehicle begins to creep toward another traffic lane. Thus, the tire track indicator system, based on the illumination, may indicate to the driver that the vehicle is on a path that will take the vehicle into the other lane. The illumination may also allow the driver to follow in the middle (or substantially in the middle) of their lane without getting too close to the lane markers.

The example tire track indicator system 800 of FIG. 8 is a view from a driver's seat, through a windshield. As illustrated two focused beams of light 802 and 804 are projected in front of the vehicle in a direction of travel that the steering tires are currently headed. The two beams of light 802 and 804 allow the driver to see where the vehicle is headed.

The two beams of light 802 and 804 do not obstruct view of the road 806, or other vehicles 808 and 810 on the road. Further, the two beams of light 802 and 804 may be viewable both during the day and at night. According to some implementations, the beams of light may be colored, based on a context associated with the beams of light. For example, the beam color may be varied based upon different factors, such as a car in a driver's blind spot, deviation from the lane, chronic deviation (e.g., swerving), and so on.

Figure 9:
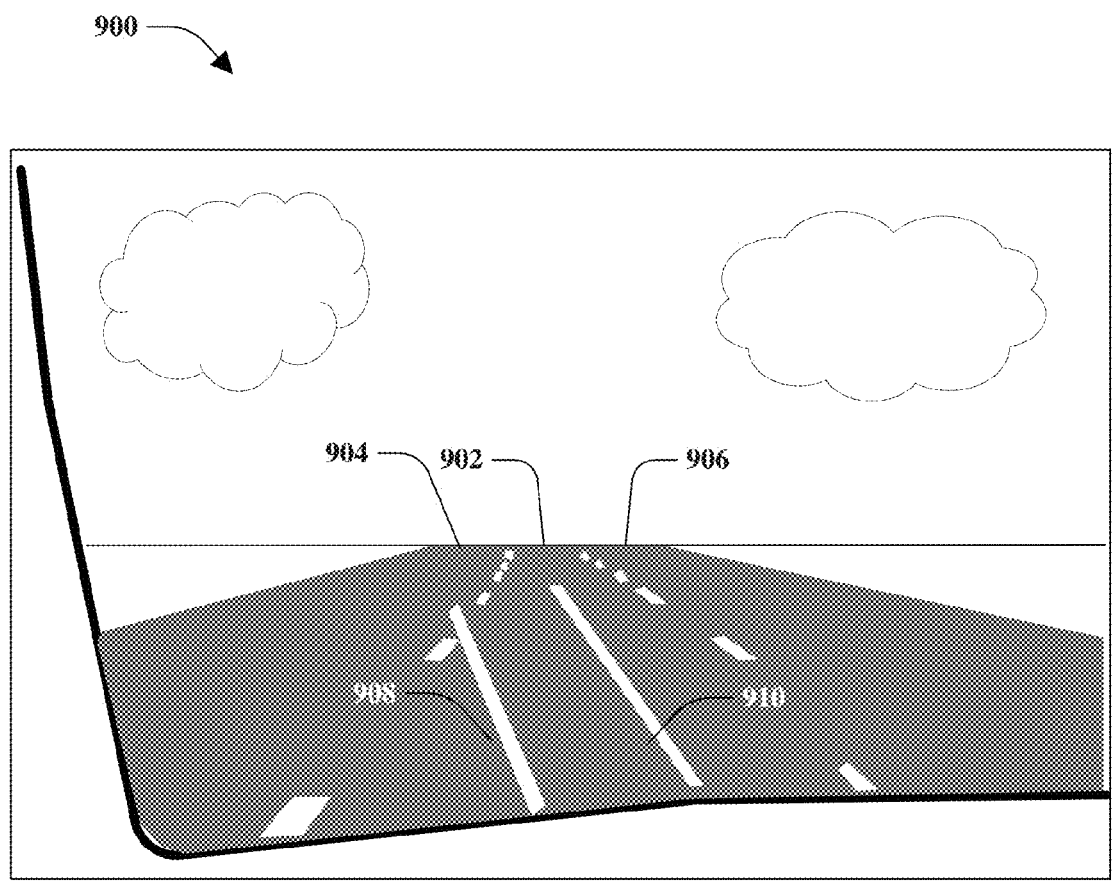
FIG. 9 illustrates an example representation of a tire track indicator system depicting a vehicle on a trajectory toward another lane of traffic, according to an aspect of this disclosure.

FIG. 9 illustrates an example representation of a tire track indicator system 900 depicting a vehicle on a trajectory toward another lane of traffic, according to an aspect of this disclosure. FIG. 9 is from the perspective a driver looking through a windshield. As illustrated, the vehicle is traveling in a middle lane 902 of a road. There is also a left lane 904 and a right lane 906.

The illumination of beams provided by the tire track indicator system 900 are illustrated by a first beam 908 and a second beam 910, which follow the path of the physical tire tracks based on the current position of the wheels. In this example, the first beam 908 and the second beam 910 indicate that if the vehicle is kept on the same path, the vehicle will travel into the left lane 904. Therefore, if the driver does not intend to go into the left lane 904, corrective measures may be taken by the driver, or automatically by the vehicle.

According to an implementation, when the indication is that the vehicle will be crossing into another lane, the output may be modified. For example, if the output is one or more beams of light, a strobe action may be initiated to bring the driver's attention to the fact that the vehicle is on a potentially undesirable course. The determination related to the unintended course of travel may be based on the absence of an activation of a turn signal or based on another parameter (e.g., the vehicle is in a no passing zone, the vehicle is in a construction zone, there is another vehicle in the expected path of travel, and so on).

In an implementation, if the left lane 904 is a sidewalk or other lane occupied by pedestrians (e.g., bike lane), at least the first beam 908 may project onto the left lane, as illustrated. In this case, if a person is in the left lane 904 (e.g., someone is walking), that person may take corrective action. For example, if the left lane 904 is a sidewalk and there are people walking on the sidewalk, the people may get out of the way of the vehicle.

Figure 10:
FIG. 10 illustrates an example representation of a vehicle equipped with a tire track indicator system, according to an aspect of this disclosure.

FIG. 10 illustrates an example representation 1000 of a vehicle equipped with a tire track indicator system, according to an aspect of this disclosure. As illustrated, a vehicle 1002 may project one or more light beams, illustrated as a first beam 1004 and a second beam 1006, which indicate a current trajectory of the vehicle 1002.

Also illustrated, generally at 1008 is an illumination provided by the headlights of the vehicle 1002. The first beam 1004 and the second beam 1006 may be perceived as brighter than the headlights. Brightness has been defined as an attribute of visual perception in which a source appears to be radiating or reflecting light. Thus, "brightness" is the perception produced by the luminance of a source. Accordingly, the first beam 1004 and the second beam 1006 may be configured with a luminance such that the illumination 1008 of the headlights does not interfere with the illumination and projection of the first beam 1004 and the second beam 1006.

In another example, output sources may include two or more filaments. To output the indication, the first filament is energized. To increase an intensity of the light, such as when the vehicle is deviating from a lane, a second filament (or more filaments) are energized.

Figure 11:
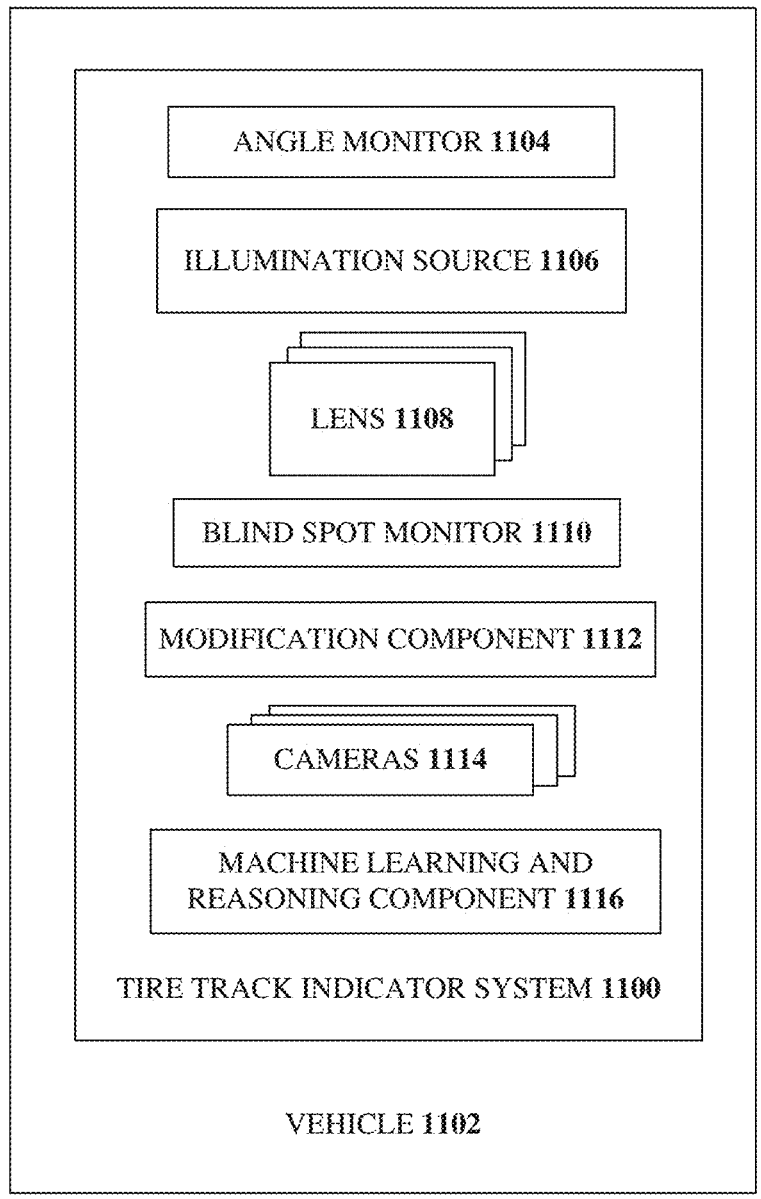
FIG. 11 illustrates an example, non-limiting, method for providing an indication of a projected path of a vehicle to a driver of the vehicle, according to an aspect of this disclosure.

FIG. 11 illustrates an example, non-limiting, tire track indicator system 1100 configured to provide an indication of a current path of travel, according to an aspect of this disclosure. The tire track indicator system 1100 is included, at least partially, within a vehicle 1102.

Included in the tire track indicator system 1100 is an angle monitor 1104 that may be configured to determine a current angle of the vehicle 1102. Also included is an illumination source 1106 that may be configured to provide one or more beams of light that are projected through one or more lenses 1108. According to an implementation, the illumination source 1106 may be headlights of the vehicle 1102, or other lights associated with the vehicle 1102, such as taillights, parking lights, and so on.

The one or more lenses 1108 may be integrated with the illumination source 1106 or may be separate from the illumination source 1106. For example, the one or more lenses 1108 may be operatively connected to the vehicle 1102 at a location where the illumination source 1106 causes a light beam to travel through the one or more lenses 1108. For example, if the illumination source is a headlight, at least one lens may be operatively connected to the vehicle near (or in front of) the headlight so that light from the headlight passes through the lens.

Also included in the tire track indicator system 1100 may be a blind spot monitor 1110 (e.g., the blind spot monitor 320 of FIG. 3). The blind spot monitor 1110 may be configured to detect neighboring vehicles. Based on the detection of one or more neighboring vehicles, a modification component 1112 may be configured to change an output of the tire track indicator system 1100.

For example, if a car is passing the vehicle 1102 on the left, an output (e.g., beam of light) on the left side of the vehicle may change colors, while the output on the right side of the vehicle does not change. Alternatively, both outputs may change at substantially the same time. In another example, if a vehicle is passing or is being passed, the respective output (or both outputs) is changed from a steady output to a pulsating (e.g., flashing) output.

One or more cameras 1114 (e.g., the cameras 322 of FIG. 3) may also be included in the tire track indicator system 1100. The one or more cameras 1114 may be configured to detect lanes in front (and to the sides) of the vehicle 1102. If a camera detects that the vehicle 1102 is headed on a path that will cause the vehicle 1102 to cross into another lane (and a turn signal is not activated), the modification component 1112 may cause one or more outputs (e.g., beams of light) to change in order to bring the potential problem to the attention of the driver.

Automated learning may be employed to facilitate one or more of the disclosed aspects. For example, a machine learning and reasoning component 1116 may be utilized to automate one or more of the disclosed aspects. The machine learning and reasoning component 1116 may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 1116 may employ principles of probabilistic and decision theoretic inference. Additionally or alternatively, the machine learning and reasoning component 1116 may rely on predictive models constructed using machine learning and/or automated learning procedures. Logic-centric inference may also be employed separately or in conjunction with probabilistic methods.

The machine learning and reasoning component 1116 may infer whether a vehicle is on a projected path temporarily (e.g., going around an object in the road) or permanently (if another action is not taken, such as returning to the previous travel lane). In another example, the machine learning and reasoning component 1116 may infer that a projected path is the result of a vehicle malfunction or based on another factor (e.g., driver emergency due to a medical condition). Such inferences may be made by obtaining knowledge about the road conditions, the weather conditions, information about the driver of the vehicle, vehicle information including maintenance information, and so on. Based on this knowledge, the machine learning and reasoning component may make an inference based on which actions to implement, whether a light beam should change in intensity, color, or output (e.g., go from a beam of light to a flashing light or a strobe action light), or combinations thereof.

As used herein, the term "inference" refers generally to the process of reasoning about or inferring states of the system, a vehicle, a component, a module, the environment, and/or one or more sets of content from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference results in the construction of new events and/or actions from a set of observed events and/or stored event data, whether or not the events are correlated in close temporal proximity, and whether the events and/or data came from one or several event and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection with monitoring and selectively outputting an indication perceivable by the driver as well as other occupants of the vehicle, occupants of other vehicles, pedestrians, and so on) may employ various artificial intelligence-based schemes for carrying out various aspects thereof. For example, a process for determining if certain information should be presented to facilitate an awareness of the vehicle trajectory, if corrective maneuvers are necessary and, therefore, an output of the indication should change to bring more awareness to what is occurring, and so on may be enabled through an automatic classifier system and process.

A classifier is a function that maps an input attribute vector, $x=(x1, x2, x3, x4, xn)$, to a confidence that the input belongs to a class. In other words, $f(x)=\text{confidence}(\text{class})$. Such classification may employ a probabilistic and/or statistical-based analysis (e.g., factoring into the analysis utilities and costs) to prognose or infer an action that should be employed related to content access. In the case of content, for example, attributes may be identification of the content attempting to be accessed and the classes may be information related to the content.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein may be inclusive of statistical regression that is utilized to develop models of priority.

One or more aspects may employ classifiers that are explicitly trained (e.g., through a generic training data) as well as classifiers that are implicitly trained (e.g., by observing changes or updates to one or more electronic control units, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria when to output a certain indication, a format of the indication (e.g., steady stream of light, flashing light), an intensity of the indication, a color of the indication, and so forth. The criteria may include, but is not limited to, vehicle information, driver information, road conditions, weather condition, and so forth.

Additionally or alternatively, an implementation scheme (e.g., a rule, a policy, and so on) may be applied to control and/or regulate access to content. In some implementations, based upon a predefined criterion, the rules-based implementation may automatically and/or dynamically interpret content information and automatically output an indication of a certain type, format, color, and so on. In response thereto, the rule-based implementation may automatically interpret and carry out functions associated with the content access by employing a predefined and/or programmed rule(s) based upon any desired criteria.

Methods that may be implemented in accordance with the disclosed subject matter will be better appreciated with reference to the following flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 12:
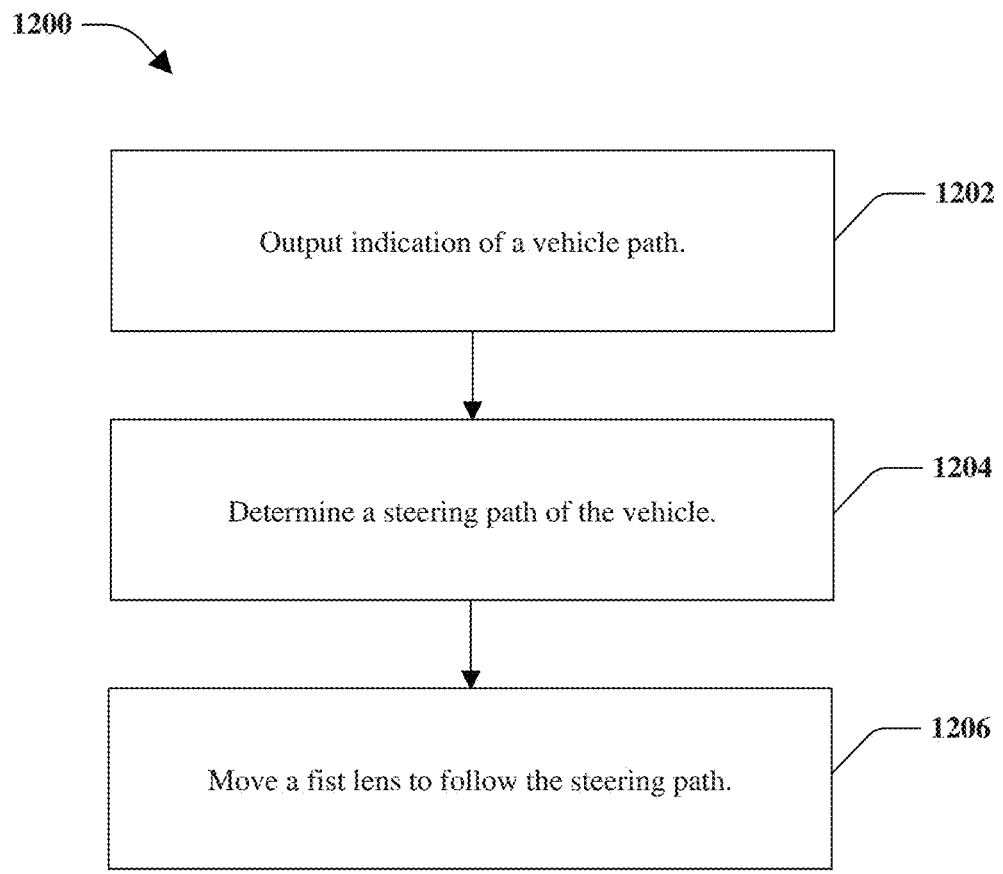
FIG. 12 illustrates an example, non-limiting, method for displaying tire track indicators, according to an aspect of this disclosure.

FIG. 12 illustrates an example, non-limiting, method 1200 for providing an indication to a driver of a vehicle of a projected path of the vehicle, according to an aspect of this disclosure. The method 1200 may be implemented using any of the systems, such as the system 100 of FIG. 1, described herein. The method includes outputting, at 1202, an indication of a vehicle path. According to an implementation, this may include using a first lens and a light source. However, the disclosed aspects are not limited to this implementation. Instead, more than one lens may be utilized. Additionally or alternatively, headlights, taillights, parking lights, fog lights, or other lights may be utilized to output the indication.

At 1204, a steering path of the vehicle is determined. For example, one or more sensors operatively connected to one or more wheels of the vehicle may be utilized to determine the steering path. In another example, a steering wheel or steering column (or sensors associated therewith) may be utilized to determine the steering path. Further, one or more other manners of determining the steering path may be utilized.

At least a first lens is moved, at 1206, to follow the steering path of the vehicle. For example, if a vehicle is moving in a relatively straight line path on a straight road, the lens may be pointing directly in front of the vehicle. However, if the vehicle is veering off to the left, the one or more lenses may be moved (e.g., pivoted, rotated) to emphasize the direction of travel. Further, if the vehicle is turning, the one or more lenses may be moved further to mimic the turning path of the vehicle.

According to an implementation, the first lens is included in a set of lenses. Further to this implementation, outputting the indication may include using the set of lenses that are coupled to headlights of the vehicle generating physical tire tracks of the vehicle. Additionally, outputting the indication may include outputting another indication of the vehicle path comprising using a second lens and the light source.

In accordance with another implementation, outputting the indication may include outputting the light source that comprises a luminesce that has a brighter intensity than another luminesce projected by headlights of the vehicle. By using a brighter intensity, the light source may be distinguished from a light projected by the headlights.

Additionally, the method may include determining an unexpected deviation from a current lane of travel and changing an output of the indication based on the unexpected deviation. Changing the output may include changing a steady stream of light to a blinking light. Changing the output may include increasing or decreasing a light intensity. According to another aspect, changing the output may include using different colors.

Figure 13:
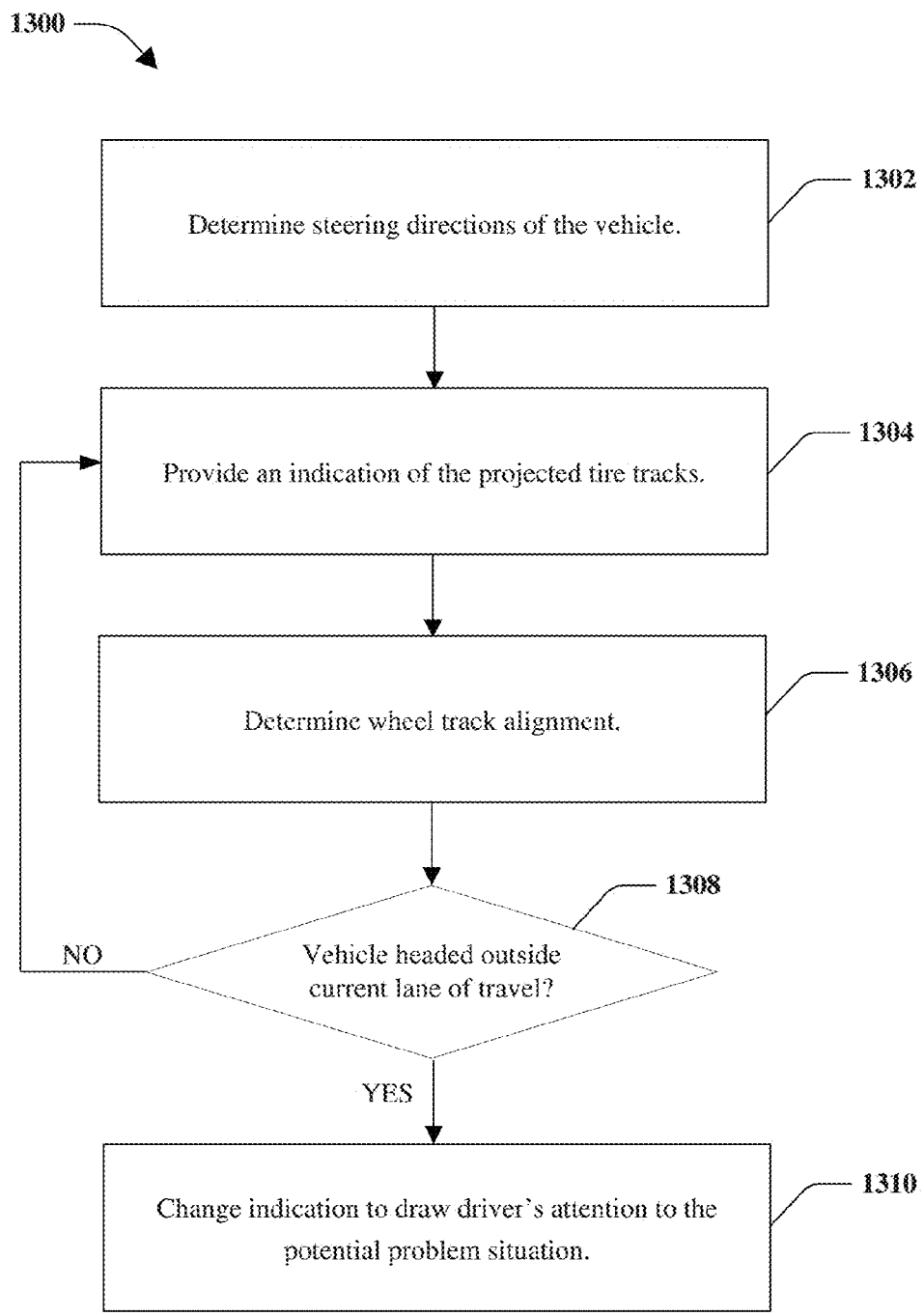
FIG. 13 illustrates another example, non-limiting, method for displaying tire track indicators to predict traffic lane departures, according to an aspect of this disclosure.

FIG. 13 illustrates an example, non-limiting, method 1300 for displaying tire track indicators, according to an aspect of this disclosure. The method 1300 may be implemented using any of the systems, such as the system 1100 of FIG. 11, described herein.

The method 1300 may begin, at 1302, when steering directions of the vehicle are determined. According to an implementation, the steering directions may be determined by an angle monitor (e.g., the angle monitor 104 of FIG. 1, the angle monitor 204 of FIG. 2, and so on). According to some implementations, other types of devices may be used. In one example, input may be taken directly from the steering wheel.

An indication of the projected tire tracks is provided, at 1304. According to an implementation, the indication is provided as one beam of light projecting from the front of the vehicle. In another implementation, the indication is provided as a set of two or more beams of light projecting from the front of the vehicle. In further implementations, the indication is provided as one beam or a set of two or more beams of light projecting from the rear of the vehicle.

At 1304, wheel track alignment is determined. According to an implementation, wheel track alignment is determined based on a position of the wheels of the vehicle. The positioning may be set to the perspective of the driver (e.g., the driver's point of view). Thus, the wheel tracks may be adjusted for different drivers, or different types of drivers.

Another determination is made, at 1306, whether the vehicle is heading in a direction that will take the vehicle outside its current lane of travel. For example, the determination, at 1306, is made based on one or more cameras or other sensors detecting lane markings on the road (or estimating lane markings if not painted on the road). In another example, the determination is made based on whether or not a turn signal is activated.

If the determination is that the vehicle is not headed outside a current lane of travel, or a turn signal is activated indicating the vehicle is heading in that direction ("NO"), method 1300 returns to 1304 and the indication is provided. However, if the determination is that the vehicle is headed outside the current lane of travel ("YES") the indication is changed to draw the driver's attention to the possible problem.

Figure 14:
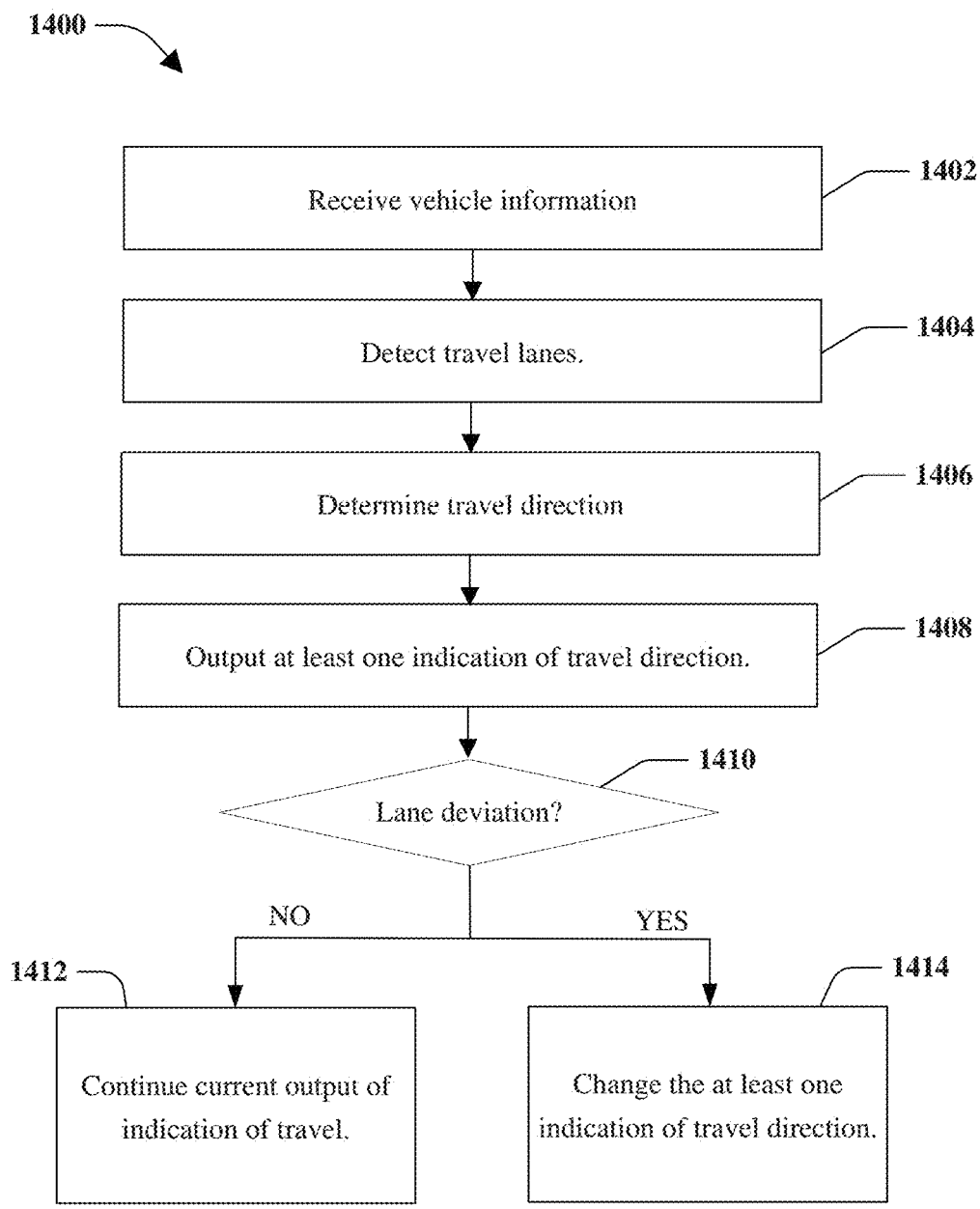
FIG. 14 illustrates another example, non-limiting, method for displaying tire track indicators to predict lane departures, according to an aspect of this disclosure

FIG. 14 illustrates another example, non-limiting, method 1400 for displaying tire track indicators to predict lane departures, according to an aspect of this disclosure. The method 1400 may be implemented using any of the systems, such as the system 1100 of FIG. 11, described herein.

At 1402, vehicle information is received. The vehicle information may include, but is not limited to, steering directions, whether a turn signal has been activated, and so on. The vehicle information may be received from a controller area network data (e.g., the controller area network data 312 of FIG. 3).

Travel lanes are detected, at 1404. The travel lanes detected may be a traffic lane currently being traveled by the vehicle and contiguous traffic lanes. To detect the travel lanes, one or more sensors may be utilized. For example, one or more cameras may be utilized to determine the boundaries of each lane of travel, including road edge boundaries. The contiguous traffic lanes may include traffic lanes intended to be traversed by vehicles (e.g., turning lanes, emergency lanes, and so forth). Further, the contiguous traffic lanes may include lanes not intended to be traversed by vehicles, which may include, but are not limited to, bicycle lanes, horse and buggy lanes, painted island lanes, and so on. According to some implementations, the detected travel lanes may include edges of the road and/or other portions of the ground, ground surface, or objects located at the edges of the road (or even within travel lanes).

A travel direction is determined at 1406. The determination may be based upon the vehicle information and the detected travel lanes. For example, the travel direction may be determined based on the steering directions of the vehicle.

At 1408, at least one indication of a travel direction is output. The at least one indication may include a beam of light, which may be a steady or continuous beam of light. In another example, the beam of light may be a standard color of light or might be changeable colors, wherein the color changes as a function of the context.

Thus, at 1410, a determination is made whether the vehicle is on a path that indicates a lane departure (e.g., an unexpected deviation from a current lane). For example, a determination is made whether the vehicle is projected to cross a dividing line, an edge line, or another type of marker that demarcates a current lane of travel.

If the determination is that there is no lane deviation ("NO"), at 1412 a current output of indication of travel is continued (e.g., no changes are made). Alternatively, if the determination is that there is a lane deviation ("YES") at 1412 at least one indication of travel direction is changed. The change may include a color change, a type of output (e.g., continuous, flashing, blinking, and so on), an intensity, or other changes that may be perceived by the driver of the vehicle.

Figure 15:
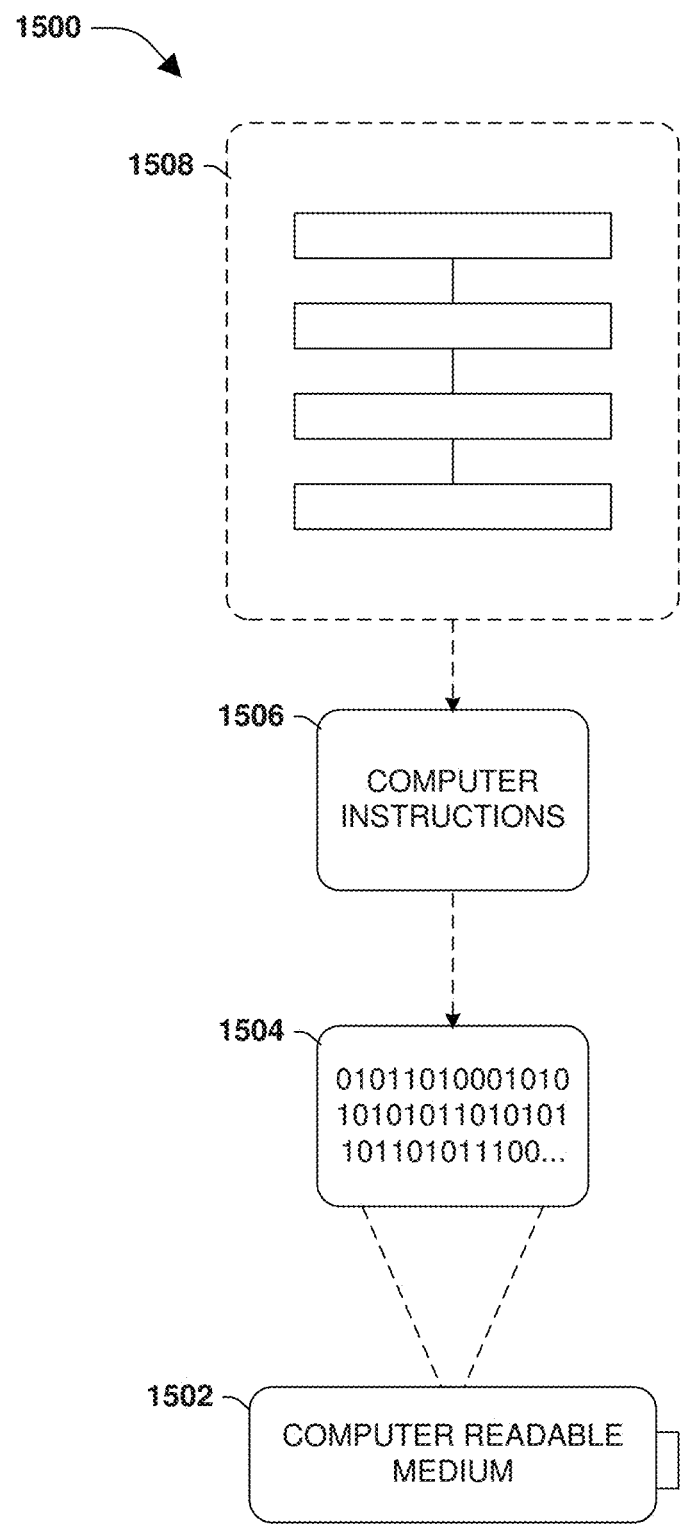
FIG. 15 illustrates an example, non-limiting, computer-readable medium or computer-readable device including processor-executable instructions configured to embody one or more of the aspects of this disclosure.

One or more implementations may include a computer-readable medium including processor-executable instructions configured to implement one or more embodiments presented herein. An embodiment of a computer-readable medium or a computer-readable device devised in these ways is illustrated in FIG. 15, wherein an implementation 1500 includes a computer-readable medium 1502, such as a CD-R, DVD-R, flash drive, a platter of a hard disk drive, and so forth, on which is encoded computer-readable data 1504. The computer-readable data 1504, such as binary data including a plurality of zero's and one's as illustrated, in turn includes a set of computer instructions 1506 configured to operate according to one or more of the principles set forth herein.

In the illustrated embodiment 1500, the processor-executable computer instructions 1506 may be configured to perform a method 1508, such as the method 1200 of FIG. 12 and/or the method 1400 of FIG. 14, for example. In another embodiment, the processor-executable instructions 1504 may be configured to implement a system, such as the system 100 of FIG. 1, for example. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 16:
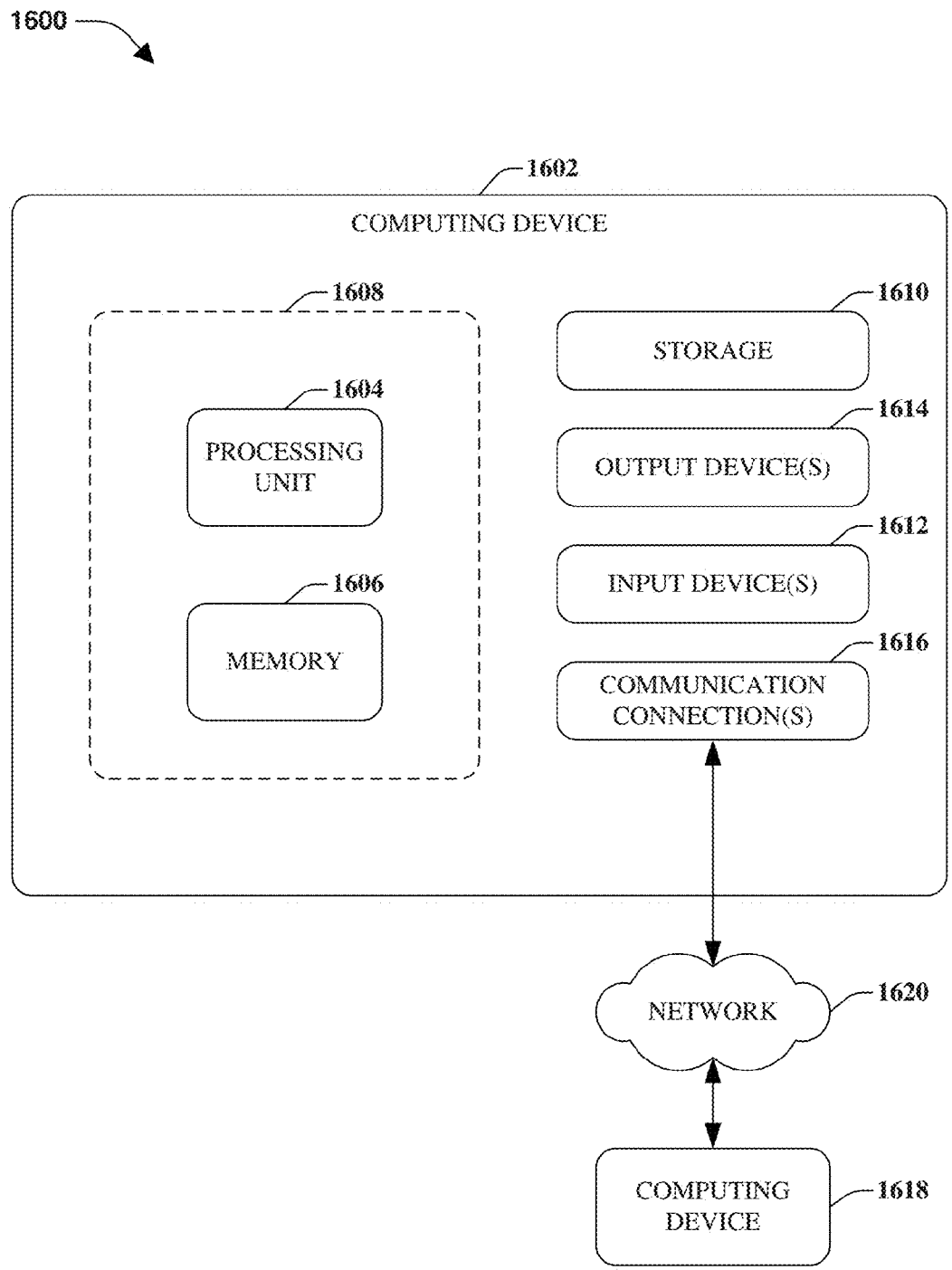
FIG. 16 illustrates an example, non-limiting computing environment where one or more of the aspects of this disclosure are implemented.

FIG. 16 and the following discussion provide a description of a suitable computing environment to implement embodiments of one or more of the aspects set forth herein. The operating environment of FIG. 16 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 16 illustrates a system 1600 that may include a computing device 1602 configured to implement one or more embodiments provided herein. In one configuration, the computing device 1602 may include at least one processing unit 1604 and at least one memory 1606. Depending on the exact configuration and type of computing device, the at least one memory 1606 may be volatile, such as RAM, non-volatile, such as ROM, flash memory, etc., or a combination thereof. This configuration is illustrated in FIG. 16 by dashed line 1608.

In other embodiments, the device 1602 may include additional features or functionality. For example, the device 1602 may include additional storage such as removable storage or non-removable storage, including, but not limited to, magnetic storage, optical storage, etc. Such additional storage is illustrated in FIG. 16 by storage 1610. In one or more embodiments, computer readable instructions to implement one or more embodiments provided herein are in the storage 1610. The storage 1610 may store other computer readable instructions to implement an operating system, an application program, etc. Computer readable instructions may be loaded in the at least one memory 1606 for execution by the at least one processing unit 1604, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 1602 may include input device(s) 1612 such as keyboard, mouse, pen, voice input device, touch input device, infrared cameras, video input devices, or any other input device. Output device(s) 1614 such as one or more displays, speakers, printers, or any other output device may be included with the device 1602. The input device(s) 1612 and the output device(s) 1614 may be connected to the device 1602 via a wired connection, wireless connection, or any combination thereof. In one or more embodiments, an input device or an output device from another computing device may be used as the input device(s) 1612 and/or the output device(s) 1614 for the device 1602. Further, the device 1602 may include communication connection(s) 1616 to facilitate communications with one or more other devices, illustrated as a computing device 1618 coupled over a network 1620.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A tire track indicator system of a vehicle, comprising:
   an angle monitor determining a steering direction of the vehicle;
   an illumination source;
   a lens directing at least a portion of light from the illumination source in the steering direction providing an indication of a travel path of the vehicle, wherein the lens is configured to move relative to the vehicle and based on a corresponding change to the steering direction, to alter a direction of at least the portion of light based on the corresponding change to the steering direction; and
   another lens directing at least another portion of light in the steering direction, wherein the portion of light comprises a first beam of light that travels a first path of a first wheel of the vehicle and the at least another portion of light comprises a second beam of light that travels a second path of a second wheel of the vehicle.

2. The tire track indicator system of claim 1, wherein the indication comprises at least one beam of light projected at a direction of travel.

3. The tire track indicator system of claim 1, further comprising at least another lens, wherein the lens and the at least another lens couple headlights of the vehicle to physical tire tracks of the vehicle.

4. The tire track indicator system of claim 1, wherein the lens is configured to change a color of the at least the portion of the light from the illumination source based on a set of contexts of the vehicle.

5. The tire track indicator system of claim 4, wherein a first context of the set of contexts comprises the steering direction of the vehicle and a second context of the set of contexts comprises a deviation of the vehicle from a current lane.

6. The tire track indicator system of claim 4, wherein a first context of the set of contexts comprises the steering direction of the vehicle and a second context of the set of contexts comprises a chronic deviation of the vehicle from a current lane.

7. The tire track indicator system of claim 1, wherein the illumination source comprises a luminesce that has a brighter intensity than another luminesce projected by headlights of the vehicle.

8. The tire track indicator system of claim 1, wherein the illumination source is placed on a front portion of the vehicle.

9. The tire track indicator system of claim 1, wherein the illumination source is integrated with the vehicle.

10. The tire track indicator system of claim 1, further comprising at least another illumination source that projects outward from a rear portion of the vehicle.

11. The tire track indicator system of claim 10, wherein the at least another illumination source changes color based on an activity of the vehicle.

12. The tire track indicator system of claim 11, wherein the activity is a lane change.

13. A method for providing an indication of a projected path of a vehicle, comprising:
   outputting an indication of a vehicle path, wherein the outputting comprises using a first lens, a second lens, and a light source;
   determining, by a system comprising a processor, a steering path of the vehicle; and
   moving, by the system and relative to the vehicle, the first lens and the second lens to follow the steering path of the vehicle, wherein the moving of the first lens is based on the steering path of the vehicle, wherein moving the first lens causes a portion of light from the light source to be directed in a first beam of light, comprising the indication, which travels a first path of a first wheel of the vehicle and another portion of light to be directed in a second beam of light that travels a second path of a second wheel of the vehicle.

14. The method of claim 13, wherein the first lens and the second lens are included in a set of lenses, and wherein the outputting the indication comprises using the set of lenses that couple headlights of the vehicle to respectively direct the first beam of light and the second beam of light.

15. The method of claim 13, wherein the outputting the indication comprises outputting the light source that comprises a luminesce that has a brighter intensity than another luminesce projected by headlights of the vehicle.

16. The method of claim 13, wherein the outputting the indication comprises placing the first lens at a position relative to a position of a first headlight.

17. The method of claim 13, wherein the outputting the indication comprises outputting a second indication of the vehicle path comprising using the second lens and the light source, wherein the second beam of light comprises the second indication.

18. The method of claim 13, further comprising:
   determining, by the system, an unexpected deviation from a current lane of travel; and
   changing an output of the indication based on the unexpected deviation.

19. A tire track indicator system, comprising:
   an angle monitor determining a steering direction of a vehicle;
   an illumination source; and
   a first lens and at least a second lens providing an indication of a travel path of the vehicle based on the steering direction at least in part by moving relative to the vehicle to direct at least a portion of light from the illumination source, wherein the first lens directs at least the portion of light to provide a first beam of light that travels a first path of a first wheel of the vehicle, and at least the second lens directs another portion of light to provide a second beam of light that travels a second path of a second wheel of the vehicle.

* * * * *